BEST AVAILABLE COPY
C. Whipple,
Reciprocating Saw Mill.
No. 218. A.I. Patented Feb. 1, 1859.
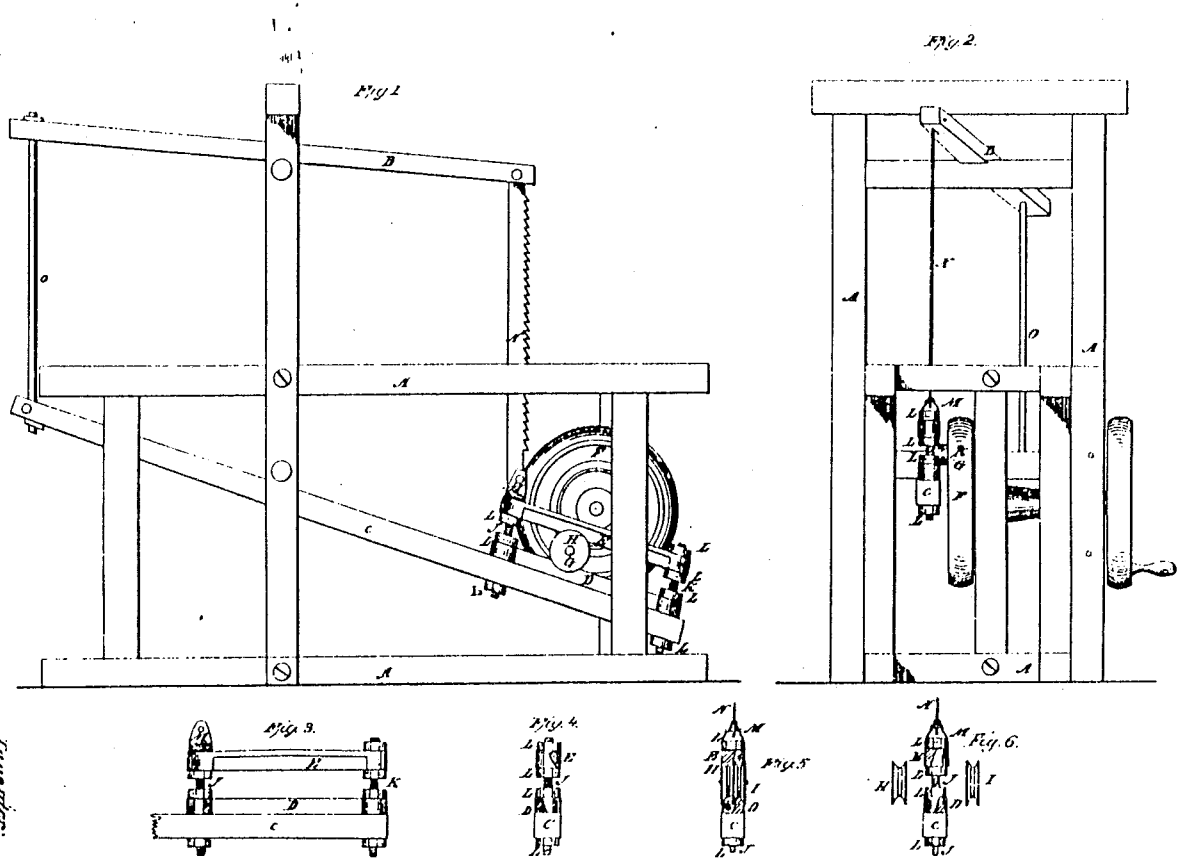
Witnesses:
J. Brainerd
W. H. Wenings
Inventor:
Carlyle Whipple
A.M. PHOTO-LITHO. CO. N.Y. (OSBORNE'S PROCESS)